ns Patent [19]

Wiezer et al.

[11] 4,376,836
[45] Mar. 15, 1983

[54] TRIAZYLAMINOTRIAZINES, THEIR PREPARATION AND THEIR USE FOR STABILIZING SYNTHETIC POLYMERS

[75] Inventors: Hartmut Wiezer, Gersthofen; Gerhard Pfahler, Augsburg, both of Fed. Rep. of Germany

[73] Assignee: Hoechst Aktiengesellschaft, Fed. Rep. of Germany

[21] Appl. No.: 282,504

[22] Filed: Jul. 13, 1981

[30] Foreign Application Priority Data

Jul. 18, 1980 [DE] Fed. Rep. of Germany ....... 3027223

[51] Int. Cl.³ .................... C08K 5/34; C07D 401/14; C07D 401/12
[52] U.S. Cl. .................................. 524/100; 544/198
[58] Field of Search ............ 260/45.8 NP, 45.8 NT; 544/198, 209; 524/100

[56] References Cited

U.S. PATENT DOCUMENTS 4,288,593  9/1981  Rody .................................. 544/198

4,335,242  6/1982  Wiezer et al. ....................... 524/198

FOREIGN PATENT DOCUMENTS 1201734  8/1970  United Kingdom ................ 544/209

Primary Examiner—V. P. Hoke
Attorney, Agent, or Firm—Connolly & Hutz

[57] ABSTRACT

Triazinylaminotriazines of the general formula

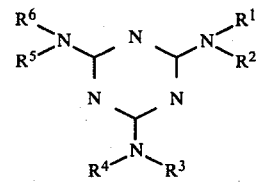

which are used as stabilizers for polymers, are prepared by reacting a cyanuric halide with amines containing triazinyl and polyalkylpiperidylamino groups.

9 Claims, No Drawings

TRIAZYLAMINOTRIAZINES, THEIR PREPARATION AND THEIR USE FOR STABILIZING SYNTHETIC POLYMERS

The present invention relates to triazinylaminotriazines which contain polyalkylpiperidine groups, a process for their preparation and their use as light stabilizers for synthetic polymers.

The new compounds correspond to the general formula (I)

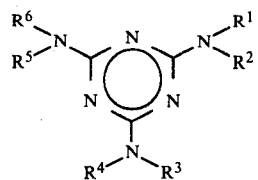

in which the radicals $R^1$, $R^2$, $R^3$, $R^4$, $R^5$ and $R^6$ are identical or different and denote $C_1$- to $C_{18}$-alkyl, preferably $C_1$- to $C_{12}$-alkyl and in particular $C_1$- to $C_8$-alkyl, $C_5$- to $C_{12}$-cycloalkyl, $C_7$- to $C_{14}$-aralkyl, preferably $C_7$- to $C_{14}$-phenylalkyl and in particular $C_7$- to $C_9$-phenylalkyl, or a group of the formula (II), (III) or (IV)

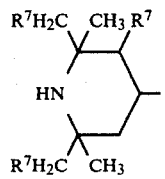

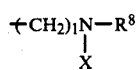

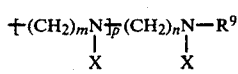

but at least the radicals $R^1$, $R^3$ and $R^5$ represent a group of the formula (III) or (IV), and, in the formulae (II), (III) and (IV), $R^7$ denotes hydrogen or $C_1$- to $C_5$-alkyl, preferably hydrogen or methyl and in particular hydrogen, $R^8$ and $R^9$ are identical or different radicals which can be hydrogen, $C_1$- to $C_{18}$-alkyl, preferably $C_1$- to $C_{12}$-alkyl and in particular $C_1$- to $C_8$-alkyl, $C_5$- to $C_{12}$-cycloalkyl, $C_7$- to $C_{14}$-phenylalkyl, in particular $C_7$- to $C_9$-phenylalkyl, or a group of the formula (II), l, m and n denote identical or different integers from 2 to 6, preferably 2 or 3, p denotes an integer from 0 to 3, preferably 0 or 1 and in particular 0, the radicals $R^1$ to $R^6$ preferably being groups of the formulae (III) or (IV) in the case where p=0, and X denotes a radical of the formula

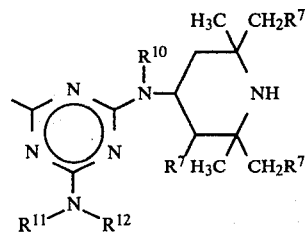

in which $R^{10}$ and $R^{11}$ represent identical or different radicals, but preferably identical radicals, which can be hydrogen, $C_1$- to $C_{18}$-alkyl, preferably $C_1$- to $C_{12}$-alkyl and in particular $C_1$- to $C_8$-alkyl, which can be substituted by hydroxyl, $C_2$- to $C_5$-alkyl, which is substituted by $C_1$- to $C_{18}$-alkoxy, preferably $C_1$- or $C_2$-alkoxy, or by $C_1$- to $C_4$-dialkylamino, preferably $C_1$- or $C_2$-dialkylamino, $C_5$- to $C_{12}$-cycloalkyl, optionally $C_1$- to $C_{18}$-alkyl-substituted phenyl, $C_7$- to $C_{14}$-aralkyl, preferably $C_7$- to $C_{14}$-phenylalkyl and in particular $C_7$- to $C_9$-phenylalkyl, or a group of the formula (II), but, in formula (I), at least one radical $R^{10}$ or $R^{11}$ must be a $C_2$- to $C_5$-alkyl group, which is substituted by $C_1$- to $C_4$-dialkylamino, and $R^{12}$ is hydrogen, $C_1$- to $C_{18}$-alkyl, preferably $C_1$- to $C_{12}$-alkyl and in particular $C_1$- to $C_8$-alkyl, $C_5$- to $C_{12}$-cycloalkyl, $C_7$- to $C_{14}$-aralkyl, preferably $C_7$- to $C_{14}$-phenylalkyl and in particular $C_7$- to $C_9$-phenylalkyl, or, preferably, a group of the formula (II).

Examples of the new compounds are:
1. 2,4,6-Tris-{1,7-bis-[2,4-bis-<N-(2,2,6,6-tetramethyl-4-piperidyl)-amino>-1,3,5-triazin-6-yl]-1,4,7-triazahept-4-yl}-1,3,5-triazine.
2. 2,4,6-Tris-{1,7-bis-[2,4-bis-<N-(2,2,6,6-tetramethyl-4-piperidyl)-butylamino>-1,3,5-triazin-6-yl]-1,4,7-triazahept-4-yl}-1,3,5-triazine.
3. 2,4,6-Tris-{1,7-bis-[2,4-bis-<N-(2,2,6,6-tetramethyl-4-piperidyl)-octadecylamino>-1,3,5-triazin-6-yl]-1,4,7-triazahept-4-yl}-1,3,5-triazine.
4. 2,4,6-Tris-{1,7-bis-[2,4-bis-<N-(2,2,6,6-tetramethyl-4-piperidyl)-3-methoxypropylamino>-1,3,5-triazin-6-yl]-1,4,7-triazehept-4-yl}-1,3,5-triazine.
5. 2,4,6-Tris-{1,7-bis-[2,4-bis-<N-(2,2,6,6-tetramethyl-4-piperidyl)-3-octyloxypropylamino>-1,3,5-triazin-6-yl]-1,4,7-triazahept-4-yl}-1,3,5-triazine.
6. 2,4,6-Tris-{1,8-bis-[2,4-bis-<N-(2,2,6,6-tetramethyl-4-piperidyl)-3-methoxypropylamino>-1,3,5-triazin-6-yl]-1,4,8-triazaoct-4-yl}-1,3,5-triazine.
7. 2,4,6-Tris-{1,9-bis-[2,4-bis-<N-(2,2,6,6-tetramethyl-4-piperidyl)-butylamino>-1,3,5-triazin-6-yl]-1,5,9-triazanon-5-yl}-1,3,5-triazine.
8. 2,4,6-Tris-{1,9-bis-[2,4-bis-<N-(2,2,6,6-tetramethyl-4-piperidyl)-hexylamino>-1,3,5-triazin-6-yl]-1,5,9-triazanon-5-yl}-1,3,5-triazine.
9. 2,4,6-Tris-{1,9-bis-[2,4-bis-<N-bis-(2,2,6,6-tetramethyl-4-piperidyl)-amino>-1,3,5-triazin-6-yl]-1,5,9-triazanon-5-yl}-1,3,5-triazine.
10. 2,4,6-Tris-{1,9-bis-[2,4-bis-<N-(2,2,6,6-tetramethyl-4-piperidyl)-3-methoxypropylamino>-1,3,5-triazin-6-yl]-1,5,9-triazanon-5-yl}-1,3,5-triazine.
11. 2,4,6-Tris-{1,9-bis-[2,4-bis-<N-(2,2,6,6-tetramethyl-4-piperidyl)-3-ethoxypropylamino>-1,3,5-triazin-6-yl]-1,5,9-triazanon-5-yl}-1,3,5-triazine.
12. 2,4,6-Tris-{1,9-bis-[2,4-bis-<N-(2,2,6,6-tetramethyl-4-piperidyl)-3-octyloxypropylamino>-1,3,5-triazin-6-yl]-1,5,9-triazanon-5-yl}-1,3,5-triazine.

13. 2,4,6-Tris-{1,9-bis-[2,4-bis-<N-(2,2,6,6-tetramethyl-4-piperidyl)-3-dimethylaminopropylamino>-1,3,5-triazin-6-yl]-1,5,9-triazanon-5-yl}-1,3,5-triazine.
14. 2,4,6-Tris-{1,9-bis-[2,4-bis-<N-(2,2,6,6-tetramethyl-4-piperidyl)-2-dimethylaminoethylamino>-1,3,5-triazin-6-yl]-1,5,9-triazanon-5-yl}-1,3,5-triazine.
15. 2,4,6-Tris-{1,9-bis-[2,4-bis-<N-(2,2,6,6-tetramethyl-4-piperidyl)-4-diethylaminobutylamino>-1,3,5-triazin-6-yl]-1,5,9-triazanon-5-yl}-1,3,5-triazine.
16. 2,4,6-Tris-{1,9-bis-[2,4-bis-<N-(2,3,6-trimethyl-2,6-diethyl-4-piperidyl)-3-methoxypropylamino>-1,3,5-triazin-6-yl]-1,5,9-triazanon-5-yl}-1,3,5-triazine.
17. 2,4,6-Tris-{1,8-bis-[2,4-bis-<N-(2,2,6,6-tetramethyl-4-piperidyl)-3-ethoxypropylamino>-1,3,5-triazin-6-yl]-1,4,8-triazaoct-4-yl}-1,3,5-triazine.
18. 2,4,6-Tris-{1,5,12-tris-[2,4-bis-<N-(2,2,6,6-tetramethyl-4-piperidyl)-3-methoxypropylamino>-1,3,5-triazin-6-yl]-1,5,8,12-tetraazadodec-8-yl}-1,3,5-triazine.
19. 2,4,6-Tris-{1,5,12-tris-[2,4-bis-<N-(2,2,6,6-tetramethyl-4-piperidyl)-3-ethoxypropylamino>-1,3,5-triazin-6-yl]-1,5,8,12-tetraazadodec-8-yl}-1,3,5-triazine.
20. 2,4,6-Tris-{1,5,12-tris-[2,4-bis-<N-(2,2,6,6-tetramethyl-4-piperidyl)-hexylamino>-1,3,5-triazin-6-yl]-1,5,8,12-tetraazadodec-8-yl}-1,3,5-triazine.
21. 2,4,6-Tris-{1-cyclododecyl-5,9-bis-[2,4-bis-<N-(2,2,6,6-tetramethyl-4-piperidyl)-3-methoxypropylamino>-1,3,5-triazin-6-yl]-1,5,9-triazanon-1-yl}-1,3,5-triazine.
22. 2,4,6-Tris-{1,9-bis-[2-<N-(2,2,6,6-tetramethyl-4-piperidyl)-3-methoxypropylamino>-4-<N-(2,2,6,6-tetramethyl-4-piperidyl)-3-dimethylaminopropylamino>-1,3,5-triazin-6-yl]-1,5,9-triazanon-5-yl}-1,3,5-triazine.
23. 2,4,6-Tris-{1,9-bis-(2,2,6,6-tetramethyl-4-piperidyl)-1,9-bis-[2,4-bis-<N-(2,2,6,6-tetramethyl-4-piperidyl)-hexylamino>-1,3,5-triazin-6-yl]-1,5,9-triazanon-5-yl}-1,3,5-triazine.
24. 2,4,6-Tris-{1,9-bis-cyclododecyl-1,9-bis-[2,4-bis-<N-(2,2,6,6-tetramethyl-4-piperidyl)-3-methoxypropylamino>-1,3,5-triazin-6-yl]-1,5,9-triazanon-5-yl}-1,3,5-triazine.
25. 2,4,6-Tris-{1,9-bis-cyclododecyl-1,9-bis-[2,4-bis-<N-2,2,6,6-tetramethyl-4-piperidyl)-3-ethoxypropylamino>-1,3,5-triazin-6-yl]-1,5,9-triazanon-5-yl}-1,3,5-triazine.
26. 2,4,6-Tris-{1,9-bis-[2,4-bis-<N-(2,2,6,6-tetramethyl-4-piperidyl)-octadecylamino>-1,3,5-triazin-6-yl]-1,5,9-triazanon-5-yl}-1,3,5-triazine.
27. 2,4,6-Tris-{1,9-bis-[2,4-bis-<N-(2,2,6,6-tetramethyl-4-piperidyl)-3-octadecyloxypropylamino>-1,3,5-triazin-6-yl]-1,5,9-triazanon-5-yl}-1,3,5-triazine.
28. 2,4,6-Tris-{1,7-bis-[2,4-bis-<N-(2,2,6,6-tetramethyl-4-piperidyl)-3-dimethylaminopropylamino>-1,3,5-triazin-6-yl]-1,4,7-triazahept-4-yl}-1,3,5-triazine.
29. 2,4,6-Tris-{1,9-bis-[2-butylamino-4-<N-(2,2,6,6-tetramethyl-4-piperidyl)-3-methoxypropylamino>-1,3,5-triazin-6-yl]-1,5,9-triazanon-5-yl}-1,3,5-triazine.
30. 2,4,6-Tris-{1,8-bis-[2-hexylamino-4-<N-(2,2,6,6-tetramethyl-4-piperidyl)-3-methoxypropylamino>-1,3,5-triazin-6-yl]-1,4,8-triazaoct-4-yl}-1,3,5-triazine.
31. 2,4,6-Tris-{1-(2,2,6,6-tetramethyl-4-piperidyl)-1,9-bis-[2,4-bis-<N-(2,2,6,6-tetramethyl-4-piperidyl)-3-methoxypropylamino>-1,3,5-triazin-6-yl]-1,5,9-triazanon-5-yl}-1,3,5-triazine.
32. 2,4,6-Tris-{1-(2,2,6,6-tetramethyl-4-piperidyl)-1,9-bis-[2,4-bis-<N-(2,2,6,6-tetramethyl-4-piperidyl)-hexylamino>-1,3,5-triazin-6-yl]-1,5,9-triazanon-5-yl}-1,3,5-triazine.
33. 2,4,6-Tris-{1-(2,2,6,6-tetramethyl-4-piperidyl)-5,9-bis-[2,4-bis-<N-(2,2,6,6-tetramethyl-4-piperidyl)-3-methoxypropylamino>-1,3,5-triazin-6-yl]-1,5,9-triazanon-1-yl}-1,3,5-triazine.
34. 2,4,6-Tris-{1,9-bis-[2,4-bis-<N-(2,2,6,6-tetramethyl-4-piperidyl)-octadecylamino>-1,3,5-triazin-6-yl]-1,5,9-triazanon-5-yl}-1,3,5-triazine.
35. 2,4,6-Tris-{1,9-bis-[2-dibutylamino-4-<N-(2,2,6,6-tetramethyl-4-piperidyl)-3-methoxypropylamino>-1,3,5-triazin-6-yl]-1,5,9-triazanon-5-yl}-1,3,5-triazine.
36. 2,4,6-Tris-{1,8-bis-[2-dibutylamino-4-<N-(2,2,6,6-tetramethyl-4-piperidyl)-3-methoxypropylamino>-1,3,5-triazin-6-yl]-1,4,8-triazaoct-4-yl}-1,3,5-triazine.
37. 2,4,6-Tris-{1,9-bis-[2-octadecylamino-4-<N-(2,2,6,6-tetramethyl-4-piperidyl)-3-methoxypropylamino>-1,3,5-triazin-6-yl]-1,5,9-triazanon-5-yl}-1,3,5-triazine.
38. 2,4,6-Tris-{1,7-bis-[2-<N-(2,2,6,6-tetramethyl-4-piperidyl)-3-methoxypropylamino>-4-<N-(2,2,6,6-tetramethyl-4-piperidyl)-octadecylamino>-1,3,5-triazin-6-yl]-1,4,7-triazahept-4-yl}-1,3,5-triazine.
39. 2,4,6-Tris-{1,5,12-tris-[2-octadecylamino-4-<N-(2,2,6,6-tetramethyl-4-piperidyl)-3-methoxypropylamino>-1,3,5-triazin-6-yl]-1,5,8,12-tetraazadodec-8-yl}-1,3,5-triazine.
40. 2,4,6-Tris-{1,9-bis-[2,4-bis-<N-(2,2,6,6-tetramethyl-4-piperidyl)-3-diethylaminopropylamino>-1,3,5-triazin-6-yl]-1,5,9-triazanon-5-yl}-1,3,5-triazine.
41. 2,4,6-Tris-{1,7-bis-[2,4-bis-<N-(2,2,6,6-tetramethyl-4-piperidyl)-3-dimethylaminopropylamino>-1,3,5-triazin-6-yl]-1,4,7-triazahept-4-yl}-1,3,5-triazine.

The new stabilizers are obtained from a cyanuric halide, amines containing polyalkylpiperidine groups and polyamines.

For their synthesis, as process step A, a cyanuric halide, preferably cyanuric chloride, is first reacted with 1.0 to 1.05 times, preferably 1.0 to 1.01 times, the molar amount of an amine of the formula (V)

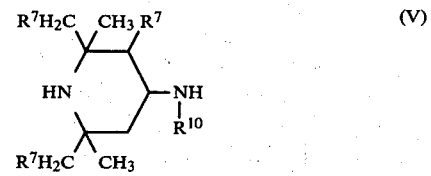

at 0° to 10° C., after which, as process step B, the compound thereby formed is reacted with 1.0 to 1.05 times, preferably 1.0 to 1.01 times, the molar amount of an amine of the formula (VI)

at 20° to 50° C., preferably 40° to 50° C., the monohalogenodiaminotriazine of the formula (VII)

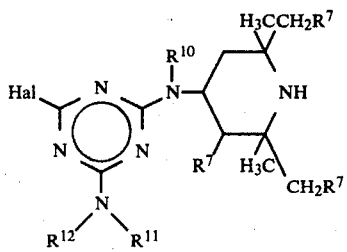 (VII)

being formed. Each step is carried out in the presence of an inert organic solvent, with the addition of equimolar amounts, relative to amine (V) and (VI), of an inorganic base as a hydrogen halide acceptor. (p+2) moles of this intermediate compound (VII) are reacted, in process step C, with a polyamine of the formula (VIII)

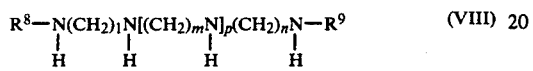 (VIII)

also in an organic solvent, in the presence of equimolar amounts of an inorganic base at 80° to 180° C., preferably 100° to 150° C., (p+2) amino groups being substituted. Finally, in process step D, derivatives of the remaining amino group are formed with the equivalent amount of a cyanuric halide, preferably cyanuric chloride, at 10° to 180° C., preferably 90° to 150° C., again in the presence of an inorganic base as a hydrogen halide acceptor and in the presence of an organic solvent, if necessary after the water of reaction has been removed, to give the compounds of the formula (I).

In the formulae (IV) to (VIII), the radicals $R^7$, $R^8$, $R^9$, $R^{10}$, $R^{11}$ and $R^{12}$ and the indices l, m, n and p have the abovementioned meanings.

The compounds according to the invention can be synthesized with or without isolation of the individual intermediate stages. In order to obtain the end products, the neutralization halide which has precipitated is filtered off, after which the filtrates from the reaction are concentrated in a rotary evaporator. The triazine compounds remain as solid resins or waxes.

The reactions are carried out in organic solvents which are inert under the reaction conditions, such as, for example, petroleum ether, acetone, ether, dioxane, benzene, toluene, xylene, cumene, mesitylene, diethyl ketone and the like, or mixtures thereof.

In all the reaction steps, it is necessary to add or to meter in equivalent amounts, relative to the hydrogen halide formed, of a base, in particular an alkali metal hydroxide in solid form or in aqueous solution. Suitable bases are, for example, sodium hydroxide, potassium hydroxide, sodium carbonate and potassium carbonate.

The reaction is accelerated by phase transfer catalysts, in particular those of the quaternary ammonium salt type, in amounts of 0.01 to 1% by weight, relative to the end product.

Amines of the formula (V) are, for example: 2,2,6,6-tetramethyl-4-aminopiperidine, 2,2,6,6-tetramethyl-4-methylamino-piperidine, 2,2,6,6-tetramethyl-4-butylamino-piperidine, 2,2,6,6-tetramethyl-4-hexylaminopiperidine, 2,2,6,6-tetramethyl-4-dodecylamino-piperidine, 2,2,6,6-tetramethyl-4-octadecylamino-piperidine, 2,2,6,6-tetramethyl-4-cyclohexylamino-piperidine, 2,2,6,6-tetramethyl-4-cyclododecylamino-piperidine, N-(2,2,6,6-tetramethyl-4-piperidyl)-3-hydroxypropylamine, N-(2,2,6,6-tetramethyl-4-piperidyl)-3-methoxypropylamine, N-(2,2,6,6-tetramethyl-4-piperidyl)-3-ethoxypropylamine, N-(2,2,6,6-tetramethyl-4-piperidyl)-3-octadecylpropylamine, N-(2,2,6,6-tetramethyl-4-piperidyl)-3-dimethylaminopropylamine, N-(2,2,6,6-tetramethyl-4-piperidyl)-4-diethylaminobutylamine and 2,3,6-trimethyl-2,6-diethyl-4-aminopiperidine.

Representatives of amines of the formula (VI) are, for example: methylamine, ammonia, butylamine, hexylamine, dodecylamine, octadecylamine, dibutylamine, dioctadecylamine, 3-methoxypropylamine, ethanolamine, 1-amino-2-hydroxy-octadecane, dicyclohexylamine, 3-octadecyloxypropylamine, 3-dimethylaminopropylamine, 3-diethylaminopropylamine, aniline, cumidine, benzylamine, 4-amino-1-butanol and piperidine.

By polyamines of the formula (VIII) there are to be understood, for example: diethylenetriamine, 3-(2-aminoethyl)-aminopropylamine, dipropylenetriamine, triethylenetetramine, N,N'-bis-(3-aminopropyl)-ethylenediamine and tetraethylenepentamine.

Triazine compounds in which all the amino groups of polyamines are substituted by diaminotriazine radicals are already known from German Offenlegungsschrift No. 2,636,130. However, in order to synthesize the compounds according to the invention, it is necessary to bring about partial substitution of the polyamines, since only these partially substituted intermediate products, which still contain NH groups, enable the subsequent reaction according to process step D to be carried out. However, it was not to be expected that such partially substituted products are formed without problems, because the differences in the reactivities of the individual NH groups in the polyamines are not large. Rather, it had to be expected that, in addition to the partially substituted triazinylpolyamines required, considerable amounts of the completely substituted compounds would be formed. That this is not the case must thus be described as exceptionally surprising.

Moreover, it could not be predicted that it would be possible for the new triazines to be incorporated without problems into the polymers to be stabilized and then also have the desired activity, since, on the basis of their high degree of branching, which is similar to that of crosslinked oligomers, it had to be expected that they would exhibit no suitability as stabilizers, or only a very poor suitability as stabilizers, because of their lack of compatibility and ability to migrate in the polymer structure. In fact, all the light stabilizers described hitherto have either a decidedly low-molecular character or, if they are high-molecular, have a chain-like structure. There was thus a prejudice against using the high-molecular, highly branched products of the present invention.

A further advantage of the new products is their low volatility, which has a particularly advantageous effect in the stabilizing of materials with a large specific surface area, such as, for example, films, fibers, filaments and the like. This is noticeable, in particular, on comparison with Example 6 of German Offenlegungsschrift No. 2,636,144, the example which, of the triazine stabilizers described in German Offenlegungsschriften Nos. 2,636,144 and 2,636,130, has the best activity.

As already mentioned, the new compounds are outstandingly suitable for stabilizing plastics against damage by the action of oxygen, heat and light. Specific examples of such plastics are:

Polymers which are derived from mono- or diunsaturated hydrocarbons, for example polyolefins, such as polyethylene, which can optionally be crosslinked, polypropylene, polybut-1-ene, polyisobutene, polymethylbut-1-ene, polymethylpent-1-ene, polyisoprene, polybutadiene and polystyrene, copolymers of the monomers on which the homopolymers mentioned are based, such as ethylene/propylene copolymers, propylene/but-1-ene copolymers, propylene/isobutene copolymers and styrene/butadiene copolymers, and terpolymers of ethylene, propylene and a diene, such as, for example, hexadiene, dicyclopentadiene or ethylidenenorbornene; and mixtures of the abovementioned homopolymers, such as, for example, mixtures of polypropylene and polyethylene, polypropylene and polybut-1-ene, polypropylene and polyisobutylene, and of a butadiene/acrylonitrile copolymer and a styrene/butadiene copolymer.

Halogen-containing vinyl polymers, such as polyvinyl chloride, polyvinylidene chloride, polyvinyl fluoride, polychloroprene and chlorinated rubbers, and copolymers of vinyl chloride and vinylidene chloride with one another and with other olefinically unsaturated monomers.

Polymers which are derived from $\alpha,\beta$-unsaturated acids and derivatives thereof, such as polyacrylates and polymethacrylates, polyacrylamides and polyacrylonitrile, copolymers thereof with one another and with other vinyl compounds, such as acrylonitrile/butadiene/styrene copolymers, acrylonitrile/styrene copolymers and acrylonitrile/styrene/acrylate copolymers, and copolymers thereof with $\alpha$-olefins, such as, for example, ethylene/(meth)acrylate copolymers.

Polymers which are derived from unsaturated alcohols and amines or their acyl derivatives or acetals, such as polyvinyl alcohol, polyvinyl acetate, stearate, benzoate or maleate, polyvinyl butyrate, polyallyl phthalate and polyallylmelamine, and copolymers thereof with other vinyl compounds, such as ethylene/vinyl acetate copolymers.

Homopolymers and copolymers which are derived from epoxides, such as polyethylene oxide or the polymers which are derived from bisglycidyl ethers.

Polyacetals, such as polyoxymethylene and polyoxyethylene, as well as those polyoxymethylenes which contain ethylene oxide as a comonomer.

Polyurethanes and polyureas.

Polycarbonates.

Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

Polyesters which are derived from dicarboxylic acids and dialcohols and/or from hydroxycarboxylic acids or the corresponding lactones, such as polyethylene terephthalate, polybutylene terephthalate and poly-1,4-dimethylol-cyclohexane terephthalate.

Crosslinked polymers which are derived from aldehydes on the one hand and phenols, ureas and melamines on the other hand, such as phenol/formaldehyde resins, urea/formaldehyde resins and melamine/formaldehyde resins.

Finally, the new compounds can also be employed as stabilizers in the field of resins and lacquers. Examples are thermosetting and thermoplastic acrylic resins which are used for automobile lacquerings [Encyclopedia of Polymer Science and Technology, Interscience Publishers, New York, Volume 1 (1964), pages 273–276 and Volume 13 (1970), pages 530–532 and "Understanding Paint" by W. R. Fuller, in American Paint Journal Co., St. Louis, 1965, pages 124–135], acrylic resin lacquers, that is to say the customary stoving lacquers [described, for example, in H. Kittel's "Lehrbuch der Lacke und Beschichtungen" ("Textbook of Lacquers and Coatings"), Volume 1, Part 2, pages 735 and 742 (Berlin, 1972), and in H. Wagner and H. F. Sarx "Lackkunstharze" ("Synthetic Resins for Lacquers"), pages 229–235] and, in particular, mixtures based on thermocrosslinkable acrylic resin and styrene and lacquers and coatings based on an acrylic/melamine resin and an alkyd/acrylic/melamine resin. Such lacquers can contain, as further additives, other customary light stabilizers, phenolic antioxidants, pigments, dyestuffs, metal deactivators and the like.

The stabilization of polyolefins, styrene polymers, polyamides, poly-(meth)acrylates and polyurethanes, for which the compounds are preferably suitable, is of particular importance. Examples of these polymers are high-density polyethylene and low-density polyethylene, polypropylene, ethylene/propylene copolymers, polystyrene and styrene/butadiene/acrylonitrile terpolymers; mixtures of polyolefins or styrene polymers, and polyurethanes on a polyether or polyester basis.

The new stabilizers are incorporated into the polymer compositions by generally customary methods. The incorporation can be effected, for example, by mixing the compounds and, where appropriate, other additives into the melt by the methods customary in the art, before or during shaping, or by applying the dissolved or dispersed compounds to the polymer directly or mixing them into a solution, suspension or emulsion thereof, allowing the solvent subsequently to evaporate off if necessary. The amounts are 0.01 to 5% by weight, preferably 0.05 to 2.5 and in particular 0.1 to 1.0% by weight, relative to the material to be stabilized. The new compounds can also be added in the form of a master batch, which contains these compounds, for example, in a concentration of 2.5 to 50% by weight, preferably 5.0 to 20% by weight, to the plastics to be stabilized.

If appropriate, the plastics stabilized by the addition of the substances according to the invention can also contain other known and customary additives, such as, for example, antioxidants based on phenols and sulfides, UV absorbers and light stabilizers, phosphite stabilizers, metal compounds, epoxide stabilizers and polyhydric alcohols.

Examples of antioxidants are those of the type of sterically hindered phenols, such as 4,4'-butylidene-bis-(2,6-di-tert.-butylphenol), esters of $\beta$-(3,5-di-tert.-butyl-4-hydroxyphenyl)-propionic acid and monohydric or polyhydric alcohols or thioalcohols, ethylene glycol bis-[3,3-bis-(3'-tert.-butyl-4'-hydroxyphenyl)]-butyrate, 1,1,3-tris-(5-tert.-butyl-4-hydroxy-2-methylphenyl)-butane, 1,3,5-tris-(3,5-di-tert.-butyl-4-hydroxybenzyl)-2,4,6-trimethylbenzene, Ca or Ni salts of monoethyl 3,5-di-tert.-butyl-4-hydroxybenzylphosphonate, phenolic triazine compounds, thiodipropionic acid esters of fatty alcohols and dioctadecyl sulfide and disulfide.

The UV absorbers and light stabilizers include, for example, 2-(2'-hydroxyphenyl)-benzotriazoles, such as 2-(2'-hydroxy-5'-methylphenyl)-benzotriazole, 2-hydroxybenzophenones, such as 2-hydroxy-4-octoxybenzophenone, and stabilizers from the group comprising salicylates, such as octyl-phenyl salicylate, nickel chelates, oxalic acid diamides and sterically hindered piperidine compounds.

Phosphites which may be mentioned are trisnonylphenyl phosphite, trislauryl phosphite and esters of pentaerythritol phosphite.

By metal compounds known as stabilizers there are understood, in this connection: calcium soaps, barium soaps, strontium soaps, zinc soaps, cadmium soaps, magnesium soaps, aluminum soaps and lead soaps of aliphatic carboxylic acids or hydroxycarboxylic acids with about 12 to 32 C atoms, salts of the said metals with aromatic carboxylic acids, such as benzoates or salicylates and (alkyl)phenolates of these metals, and also organo-tin compounds, such as, for example, dialkyl-tin thioglycolates and carboxylates.

Known epoxide stabilizers are, for example, epoxidized higher fatty acids, such as epoxidized soya bean oil, tall oil or linseed oil or epoxidized butyl oleate, and epoxides of long-chain olefins.

Polyhydric alcohols can be, for example, pentaerythritol, trimethylolpropane, sorbitol or mannitol, that is to say preferably alcohols with 5 or 6 C atoms and 2 to 6 OH groups.

An effective stabilizer combination for poly-α-olefins, such as, for example, high-pressure, medium-pressure and low-pressure polymers of $C_2$- to $C_4$-α-olefins, in particular polyethylene and polypropylene, or of copolymers of such α-olefins, comprises, based on 100 parts by weight of polymer, for example 0.01 to 5 parts by weight of one of the compounds to be used according to the invention, 0.05 to 5 parts by weight of a phenolic stabilizer, if appropriate 0.01 to 5 parts by weight of a sulfur-containing co-stabilizer and if appropriate 0.01 to 3 parts by weight of a basic or neutral metal soap, such as, for example, calcium stearate or zinc stearate, and if appropriate 0.1 to 5 parts by weight of a phosphite, and if appropriate 0.01 to 5 parts by weight of a known UV stabilizer from the group comprising alkoxyhydroxybenzophenones, 4-hydroxyphenylbenzotriazoles, benzylidenemalonic acid mononitrile esters and so-called quenching agents, such as, for example, nickel chelates.

The plastics stabilized according to the invention can be used in the most diverse forms, for example as films, fibers, narrow tapes or profiles, or as binders for lacquers, adhesives or putty.

The examples which follow serve to illustrate the invention in more detail. The reference numerals for the individual compounds relate to the list in the description, pages 4 to 9.

EXAMPLE 1

(Compound No. 10)

28.4 g (1/20 mole) of 2,4-[N-(2,2,6,6-tetramethyl-4-piperidyl)-3-methoxypropylamino]-6-chloro-1,3,5-triazine, 150 ml of xylene, 3.3 g (1/40 mole) of dipropylenetriamine and 2 g (1/20 mole) of NaOH powder are boiled under reflux for 20 hours in a 500 ml stirred apparatus. The water of reaction is then separated off using a water separator, the mixture is cooled to 20° C., 1.5 g (1/20 mole) of cyanuric chloride and 1 g (1/40 mole) of NaOH powder are added and the mixture is stirred for a further 20 hours at 130° C. It is then filtered hot, the filtrate is concentrated to dryness and the residue is dried at 150° C. in vacuo. 28 g = 93.9% of a colorless resin of melting point 130° C. are obtained.

EXAMPLES 2 TO 21

The procedure followed was analogous to Example 1, but the starting materials given in the table which follows were used.

| Example No. | Process product (Compound No. . . .) | Starting material 6-Chlorotriazine | Starting material Polyamine | Melting point (°C.) |
| --- | --- | --- | --- | --- |
| 2 | 6 | analogous to Example 1 | 3-(2-aminoethyl)-amino-propylamine (2.95 g  1/40 mole) | 143 |
| 3 | 4 | " | diethylenetriamine (2.6 g  1/40 mole) | 126 |
| 4 | 24 | " | 1,9-bis-cyclododecyl-1,5,9-triazanonane (11.6 g  1/40 mole) | resin |
| 5 | 11 | 2,4-[N—(2,2,6,6-tetramethyl-4-piperidyl)-3-ethoxypropyl-amino]-6-chloro-1,3,5-triazine (29.8 g  0.05 mole) | analogous to Example 1 | 110 |
| 6 | 25 | " | analogous to Example 4 | resin |
| 7 | 18 | analogous to Example 1 | N,N'—bis-(3-aminopropyl)-ethylenediamine (2.9 g  1/60 mole) | 139 |
| 8 | 17 | analogous to Example 5 | analogous to Example 2 | 137 |
| 9 | 7 | 2,4-[N—(2,2,6,6-tetramethyl-4-piperidyl)-butylamino]-6-chloro-1,3,5-triazine (26.8 g  0.05 mole) | analogous to Example 1 | 179 |
| 10 | 26 | 2,4-[N—(2,2,6,6-tetramethyl-4-piperidyl)-octadecylamino]-6-chloro-1,3,5-triazine (46.4 g  0.05 mole) | analogous to Example 1 | wax |
| 11 | 27 | 2,4-[N—(2,2,6,6-tetramethyl-4-piperidyl)-3-octadecyloxy-propylamino]-6-chloro-1,3,5-triazine (48.0 g  0.05 mole) | " | " |
| 12 | 22 | 2-[N—(2,2,6,6-tetramethyl-4-piperidyl-3-methoxypropyl-amino]-4-[N—(2,2,6,6-tetra- | " | 83 |

| Example No. | Process product (Compound No....) | Starting material 6-Chlorotriazine | Polyamine | Melting point (°C.) |
|---|---|---|---|---|
| | | methyl-4-piperidyl)-3-dimethyl-aminopropylamino]-6-chloro-1,3,5-triazine (29.0 g 0.05 mole) | | |
| 13 | 29 | 2-butylamino-4-<N—(2,2,6,6-tetramethyl-4-piperidyl)-3-methoxypropylamino>-6-chloro-1,3,5-triazine (20.6 g 0.05 mole) | " | 145 |
| 14 | 30 | 2-hexylamino-4-<N—(2,2,6,6-tetramethyl-4-piperidyl)-3-methoxypropylamino>-6-chloro-1,3,5-triazine (21.9 g 0.05 mole) | analogous to Example 2 | 164 |
| 15 | 31/33 | analogous to Example 1 | 1-(2,2,6,6-tetramethyl-4-piperidyl)-1,5,9-triazanonane (6.8 g 1/40 mole) | 117 |
| 16 | 32 | 2,4-bis-<N—(2,2,6,6-tetra-methyl-4-piperidyl)-hexyl-amino>-6-chloro-1,3,5-triazine (28.6 g 0.05 mole) | analogous to Example 15 | 67 |
| 17 | 35 | 2-dibutylamino-4-<N—(2,2,6,6-tetramethyl-4-piperidyl)-3-methoxypropylamino>-6-chloro-1,3,5-triazine (23.5 g 0.05 mole) | analogous to Example 1 | resin |
| 18 | 36 | analogous to Example 17 | analogous to Example 2 | 86 |
| 19 | 37 | 2-octadecylamino-4-<N—(2,2,6,6-tetramethyl-4-piperidyl)-3-methoxypropylamino>-6-chloro-1,3,5-triazine (30.4 g 0.05 mole) | analogous to Example 1 | wax |
| 20 | 38 | analogous to Example 19 | analogous to Example 3 | wax |
| 21 | 39 | analogous to Example 19 | analogous to Example 7 | 69 |

EXAMPLE 22

(Compound No. 26) (one-pot process)

40.8 g (0.1 mole) of N-(2,2,6,6-tetramethyl-4-piperidyl)-octadecylamine, dissolved in 70 ml of xylene, are added dropwise to 9.2 g (0.05 mole) of cyanuric chloride in 80 ml of xylene at about 20° C. After the mixture has been warmed to 40° C., 4 g (0.1 mole) of NaOH powder are added, after which the mixture is stirred at the same temperature for 4 hours. 2.95 g (0.025 mole) of 3-(2-aminoethyl)-aminopropylamine and 2 g (0.05 mole) of NaOH powder are then added and the mixture is kept at about 130° C. for 16 hours. The water of reaction is then distilled off azeotropically, after which 1.54 g (0.013 mole) of cyanuric chloride and a further 2 g (0.05 mole) of NaOH powder are added at 40° C. and the mixture is stirred at 130° C. for 16 hours. After working up the mixture analogously to Example 1, a wax-like product is obtained.

EXAMPLES 23 TO 26

The procedure followed was analogous to Example 22, using other monoamines.

| Example No. | Process product (Compound No....) | Starting material Piperidylamine | Polyamine | Melting point (°C.) |
|---|---|---|---|---|
| 23 | 12 | N—(2,2,6,6-tetramethyl-4-piperidyl)-3-hydroxypropylamine (46.6 g 0.1 mole) | analogous to Example 1 | wax |
| 24 | 40 | N—(2,2,6,6-tetramethyl-4-piperidyl)-3-diethylaminopropylamine (26.9 g 0.1 mole) | analogous to Example 1 | resin |
| 25 | 13 | N—(2,2,6,6-tetramethyl-4-piperidyl)-3-dimethylaminopropylamine (24.1 g 0.1 mole) | analogous to Example 1 | 87 |
| 26 | 41 | analogous to Example 25 | analogous to Example 3 | 125 |

EXAMPLE 27

This example shows the volatility of the new triazine stabilizers in comparison with a product of the closest state of the art.

The volatilities were determined in an apparatus for thermogravimetric analysis. For this determination, equal amounts (500 mg) of the compounds according to the invention and of the comparison substance were heated to 300° C. at a heating-up rate of 2K/minute under a nitrogen atmosphere and the loss of substance was measured in mg/cm² surface. The results are shown in the table below:

| Stabilizer according to Example No. | Weight loss in mg/cm² on reaching ... °C. | | | |
|---|---|---|---|---|
| | 220 | 260 | 300 | 10 minutes at 300 |
| 1 | 0.16 | 1.50 | 4.11 | 5.85 |
| 2 | 0.47 | 1.26 | 3.32 | 6.00 |
| 7 | 0.47 | 1.11 | 5.21 | 7.11 |
| 8 | 0.47 | 2.53 | 4.11 | 5.37 |
| Comparison(+) | 0.47 | 3.48 | 10.59 | 17.38 |

(+)Substance according to Example 6 of German Offenlegungsschrift 2,636,144 (reaction product of cyanuric chloride and N,N'—(2,2,6,6-tetramethyl-4-piperidyl)-hexamethylenediamine)

EXAMPLE 28

This example is intended to show the light-stabilizing action of the new compounds in poly-α-olefins.

100 parts by weight of polypropylene with a melt index $i_5$ of about 6 g/10 minutes (determined in accordance with the method of ASTM D 1238-62 T) and a density of 0.96 were mixed with 0.1 part by weight of pentaerythrityl tetrakis-3-(3,5-di-tert.-butyl-4-hydroxyphenyl)-propionate, 0.2 part by weight of calcium stearate and 0.1 part by weight of the stabilizer, according to the invention, which was to be tested.

In order to achieve as uniform as possible a distribution on the polymer particles, the stabilizers were dissolved in a solvent and the solution was added dropwise to the polypropylene powder, whilst stirring, most of the solvent being evaporated off again by simultaneous irradiation with a IR lamp. After about 20 minutes, the calcium stearate was added and mixing was continued for a further 10 minutes. Solvent residues were removed by drying the mixture at 50° C. in a drying cabinet for 120 minutes.

The mixture was injection-molded to 60×60×1 mm sheets at 240° C. in a Windsor injection-molding machine of the SP 50 type. Test pieces according to DIN 53,455, shape 3, reduced in size in the ratio of 1:3, were stamped out of these sheets. The test pieces required as comparison samples were produced analogously, but with the omission of the stabilizer to be tested and/or with the addition of comparison stabilizers.

To determine the stability to light, the samples were subjected to irradiation with alternating light in a Xenotest-1200 apparatus from Messrs. Original Hanau Quarzlampen GmbH. The radiation intensity was modulated by UV filters (special filter glass, d=1.7 mm). The stability to light was tested in accordance with the method of DIN 53,387 (17 minutes dry, 3 minutes' sprinkling, black panel temperature of 45° C., relative atmospheric humidity of 70 to 75% during the dry period). After a certain exposure time in hours, the elongation at break was measured on a tensometer from Messrs. Instron, at a take-off rate of 5 cm/minute.

| Stabilizer according to Example No. | Exposure time in hours | Elongation at break determined, in % of the starting value |
|---|---|---|
| 1 | 1,400 | >50 |
| 7 | 1,400 | >50 |
| Polypropylene | 260 | 1 |
| Comparison(1) | 320 | 1 |

| Stabilizer according to Example No. | Exposure time in hours | Elongation at break determined, in % of the starting value |
|---|---|---|
| Comparison(2) | 1,400 | 50 |

(1)no stabilizer
(2)compound according to Example 6 of German Offenlegungsschrift 2,636,144

EXAMPLE 29

0.1 to 0.25 part by weight of the stabilizers given in Example 28 are mixed into polypropylene (®Hostalen PPU VP 1770 F from HOECHST AG) with a melt flow index MFI of 51.9 g/10 minutes at 190° C.—see DIN 53,535—using a high-speed laboratory mixer. The material thus stabilized was melted in a laboratory extruder under the customary processing conditions and processed to monofilaments (87 dtex) via a spinning pump with a multiple spinning head, and the monofilaments were then after-stretched in a ratio of 1:2.5. In each case 24 of these filaments were texturized to yarn and this yarn was worked into test fabrics. The test pieces were subjected to a light-fastness test in a fadeometer and, after the given exposure time, were subjected to the fingernail test (the fabric was rubbed lightly with the thumbnail). After an exposure time of 160 hours, the test fabrics which had been stabilized with the compounds according to the invention still showed no sign of damage.

We claim:

1. Triazinylaminotriazines of the general formula (I)

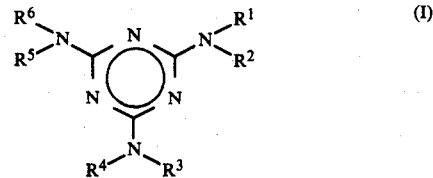

in which the radicals $R^1$, $R^2$, $R^3$, $R^4$, $R^5$ and $R^6$ are identical or different and denote $C_1$- to $C_{18}$-alkyl, $C_5$- to $C_{12}$-cycloalkyl, $C_7$- to $C_{14}$-aralkyl or a group of the formula (II), (III) or (IV)

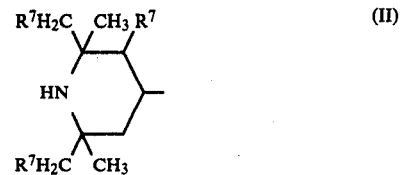

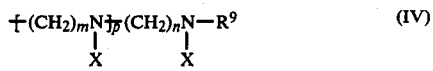

but at least the radicals $R^1$, $R^3$ and $R^5$ represent a group of the formula (III) or (IV), and, in the formulae (II), (III) and (IV), $R^7$ denotes hydrogen or $C_1$- to $C_5$-alkyl, $R^8$ and $R^9$ denote identical or different radicals, which can be hydrogen, $C_1$- to $C_{18}$-alkyl, $C_5$- to $C_{12}$-cycloalkyl, $C_7$- to $C_{14}$-aralkyl or a group of the formula (II), l, m and n denote identical or different integers from 2 to 6, p denotes an integer from 1 to 3 and X denotes a radical of the formula

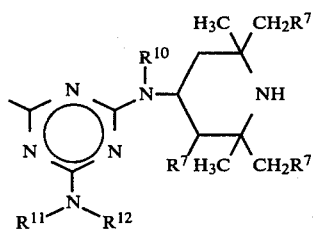

in which $R^{10}$ and $R^{11}$ represent identical or different radicals which can be hydrogen, $C_1$- to $C_{18}$-alkyl, which can be substituted by hydroxyl, $C_1$- to $C_{18}$-alkoxy or $C_1$- to $C_4$-dialkylamino, $C_5$- to $C_{12}$-cycloalkyl, phenyl, which can be substituted by $C_1$- to $C_{18}$-alkyl, or $C_7$- to $C_{14}$-aralkyl or a group of the formula (II), but, in said X, at least one radical $R^{10}$ or $R^{11}$ must be a $C_2$- to $C_5$-alkyl group which is substituted by $C_1$- to $C_4$-dialkylamino, and $R^{12}$ is hydrogen, $C_1$- to $C_{18}$-alkyl, $C_5$- to $C_{12}$-cycloalkyl, $C_7$- to $C_{14}$-aralkyl or a group of the formula (II).

2. A compound according to claim 1 wherein only one of the two radicals $R^{10}$ and $R^{11}$ of the radical denoted by X is a $C_1$- to $C_5$-alkyl group substituted by $C_1$–$C_4$ dialkylamino.

3. A compound according to claim 1 wherein both $R^{10}$ and $R^{11}$ of the radical denoted by X are $C_2$- to $C_5$-alkyl groups substituted by $C_1$–$C_4$ dialkylamino.

4. A process for the preparation of the triazinylaminotriazines as claimed in claim 1, which comprises A. reacting 1 mole of a cyanuric halide with 1.0 to 1.05 moles of an amine of the formula (V)

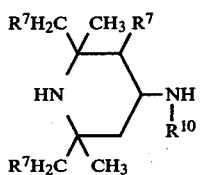

at 0° to 10° C., and then

B. reacting the compound obtained according to A with 1.0 to 1.05 moles of an amine of the formula (VI)

at 20° to 50° C., each reaction being carried out in the presence of equivalent amounts of an inorganic base and in the presence of an organic solvent, to give a compound of the formula (VII)

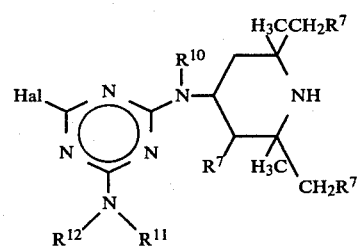

C. reacting (p+2) moles of this compound with 1 mole of a polyamine of the formula (VIII)

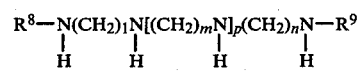

at 80° to 180° C. in the presence of equivalent amounts of an inorganic base and of an organic solvent, and finally D. allowing the reaction product obtained according to C to react with the equivalent amount, relative to the remaining amino groups, of a cyanuric halide at 10° to 180° C., likewise in an organic solvent and in the presence of an inorganic base, the indices $R^7$ to $R^{12}$, l, m, n and p used in the formulae having the meaning given in claim 1 and Hal representing halogen.

5. A process as claimed in claim 4, wherein the reaction steps A to D are carried out by a so-called "one-pot process" without isolation of the intermediate stages.

6. A process for stabilizing synthetic polymers against the harmful effect of light, which comprises adding 0.01 to 5 parts by weight, relative to the polymer, of a stabilizer as claimed in claim 1 to the polymers.

7. Process as claimed in claim 6, which comprises using as polymers polyolefins.

8. Process as claimed in claim 6, which comprises using as polymers halogen-containing polymers, polyacrylates or polymethacrylates or homopolymers or copolymers of styrene.

9. Synthetic polymers which have been stabilized against decomposition by UV light and which contain 0.01 to 5 parts by weight, relative to the polymer, of a stabilizer as claimed in claim 1.

* * * * *